(12) United States Patent
Jung et al.

(10) Patent No.: US 9,954,357 B2
(45) Date of Patent: Apr. 24, 2018

(54) APPARATUS AND METHOD FOR SUPPLYING HYBRID POWER OF OFFSHORE PLANT

(71) Applicant: DAEWOO SHIPBUILDING & MARINE ENGINEERING CO., LTD., Seoul (KR)

(72) Inventors: Ho Young Jung, Geoje-si (KR); Young Ho Bae, Geoje-si (KR)

(73) Assignee: DAEWOO SHIPBUILDING & MARINE ENGINEERING CO., LTD., Seoul (KR)

(*) Notice: Subject to any disclaimer, the term of this patent is extended or adjusted under 35 U.S.C. 154(b) by 115 days.

(21) Appl. No.: 15/106,246

(22) PCT Filed: Dec. 18, 2014

(86) PCT No.: PCT/KR2014/012536
§ 371 (c)(1),
(2) Date: Jun. 17, 2016

(87) PCT Pub. No.: WO2015/093871
PCT Pub. Date: Jun. 25, 2015

(65) Prior Publication Data
US 2016/0322815 A1    Nov. 3, 2016

(30) Foreign Application Priority Data

Dec. 18, 2013  (KR) .................. 10-2013-0158009
Jun. 19, 2014  (KR) .................. 10-2014-0075135

(51) Int. Cl.
*H02J 7/34*      (2006.01)
*H02J 1/00*      (2006.01)
(Continued)

(52) U.S. Cl.
CPC .................. *H02J 1/00* (2013.01); *E21B 3/02* (2013.01); *H02J 1/102* (2013.01); *H02J 3/28* (2013.01);
(Continued)

(58) Field of Classification Search
CPC ...... H02J 3/32; H02J 7/34; H02J 7/345; H02J 60/16; H02J 3/30; H02J 3/28;
(Continued)

(56) References Cited

U.S. PATENT DOCUMENTS 4,965,463 A    10/1990  Maruyama et al.
8,373,949 B2    2/2013  Bourgeau
(Continued)

FOREIGN PATENT DOCUMENTS

AU    2008326267 A1    5/2009
CN    102640376 A      8/2012
(Continued)

OTHER PUBLICATIONS

International Search Report dated Mar. 27, 2015 of PCT/KR2014/012536 which is the parent application an its English translation—4 pages.
(Continued)

*Primary Examiner* — Robert Deberadinis
(74) *Attorney, Agent, or Firm* — Knobbe Martens Olson & Bear LLP (57) ABSTRACT

A power supply system offshore plant comprises: a generator; an AC/DC converter converting, AC generated from the generator into DC to supply the direct current to a DC bus; a power load connected to the DC bus to generate regenerative power; a first power storage unit for storing power when a voltage of the DC bus is maintained at a level of a first threshold value or higher for a first time period, and supplying the stored power to the DC bus when the voltage
(Continued)

of the DC bus is maintained at a level of a second threshold value or lower for a second time period; and a first resistance unit for consuming power when the voltage of the DC bus is maintained at the level of the first threshold value or higher for a third time period. The third time period is longer than the first time period.

13 Claims, 9 Drawing Sheets

(51) Int. Cl.
| | |
|---|---|
| *H02J 1/10* | (2006.01) |
| *H02J 3/36* | (2006.01) |
| *H02J 3/38* | (2006.01) |
| *E21B 3/02* | (2006.01) |
| *H02P 3/18* | (2006.01) |
| *H02M 3/04* | (2006.01) |
| *H02M 7/04* | (2006.01) |
| *H02J 3/28* | (2006.01) |
| *H02J 3/30* | (2006.01) |
| *H02J 3/32* | (2006.01) |

(52) U.S. Cl.
CPC .................. *H02J 3/30* (2013.01); *H02J 3/32* (2013.01); *H02J 3/36* (2013.01); *H02J 3/381* (2013.01); *H02J 7/34* (2013.01); *H02J 7/345* (2013.01); *H02M 3/04* (2013.01); *H02M 7/04* (2013.01); *H02P 3/18* (2013.01); *H02J 2001/106* (2013.01); *Y02E 60/16* (2013.01); *Y02E 60/60* (2013.01)

(58) Field of Classification Search
CPC ..... H02J 2001/106; Y02E 60/60; H02M 7/04; H02M 3/04; H02P 3/18; E21B 3/02
See application file for complete search history.

(56) References Cited

U.S. PATENT DOCUMENTS

| | | |
|---|---|---|
| 2009/0176417 A1 | 7/2009 | Rembach et al. |
| 2009/0195074 A1 | 8/2009 | Buiel |
| 2009/0302153 A1 | 12/2009 | Matasso et al. |
| 2012/0223524 A1 | 9/2012 | Williams |
| 2013/0307444 A1 | 11/2013 | Settemsdal |
| 2016/0308362 A1 | 10/2016 | Jung et al. |
| 2017/0040795 A1 | 2/2017 | Jung et al. |

FOREIGN PATENT DOCUMENTS

| | | |
|---|---|---|
| EP | 2498364 A1 | 9/2012 |
| EP | 2503666 A2 | 9/2012 |
| EP | 2670019 A1 | 12/2013 |
| JP | 2009-27774 A | 2/2009 |
| JP | 2009-33936 A | 2/2009 |
| JP | 2016-541227 A | 12/2016 |
| WO | 2013/099957 A1 | 7/2013 |

OTHER PUBLICATIONS

Office Action dated Jul. 11, 2017 of corresponding Japanese Patent Application No. 2016-540589—6 pages.
Office Action dated Jul. 11, 2017 of Japanese Patent Application No. 2016-540611 corresponding to co-pending U.S. Appl. No. 15/106,237—4 pages.
Office Action dated Jun. 6, 2017 of Japanese Patent Application No. 2016-540598 corresponding to co-pending U.S. Appl. No. 15/106,257—7 pages.
Extended European Search Report dated Jul. 13, 2017 of European Patent Application No. 14871348.0 corresponding to co-pending U.S. Appl. No. 15/106,257—10 pages.
International Search Report dated Mar. 27, 2015 of PCT/KR2014/012538 corresponding to co-pending U.S. Appl. No. 15/106,237—4 pages.
International Search Report dated Mar. 27, 2015 of PCT/KR2014/012539 corresponding to co-pending U.S. Appl. No. 15/106,257—4 pages.
Notice of Allowance dated Oct. 17, 2017 of Japanese Patent Application No. 2016-540611 corresponding to co-pending U.S. Appl. No. 15/106,237—3 pages.
Extended European Search Report dated Aug. 23, 2017 of European Patent Application No. 14870830.8 corresponding to co-pending U.S. Appl. No. 15/106,237—9 pages.

APPARATUS AND METHOD FOR SUPPLYING HYBRID POWER OF OFFSHORE PLANT

TECHNICAL FIELD

The present invention relates to hybrid power supply for an offshore plant, and, more particularly, to a hybrid power supply apparatus and method using regenerative power generated in an offshore plant.

BACKGROUND ART

With rapid industrialization and industrial development, consumption of resources such as petroleum has increased, and stable production and supply of oil have become a crucial global problem.

For this reason, development of smaller marginal fields or deep-sea oil fields, which has been ignored due to lack of economic feasibility, is now emerging. Thus, development of offshore plants provided with oil drilling equipment suitable for use in such oil fields is actively carried out along with development of seabed mining technology.

An offshore plant is provided with various types of drilling-related equipment such as a Derrick crane system, a draw-works, a top drive, a mud pump, a cement pump, a riser, and a drill pipe.

The draw-works performs lifting of the drill pipe, insertion of a casing, and the like, and includes a drum and a motor. The drum is powered by the motor so as to wind or unwind a wire rope for controlling lifting of the drill pipe. The rotational speed of the motor can be adjusted so as to adjust the rotational speed of the drum, thereby enabling adjustment of the speed of the drill pipe.

The top drive provides power for drilling and pipe fastening in drilling operation.

Offshore plants are divided into a stationary platform anchored at one point of nearshore to perform drilling operations and a floating offshore plant capable of performing drilling operation at ocean depths of 3,000 m or more.

The floating offshore plant is provided with a plurality of thrusters as a main propulsion device or a propulsion device for computer-aided dynamic positioning. The thrusters are located at the bottom of a ship to change an operating direction of a propeller and are commonly used to allow the ship to navigate or to sail in a canal or enter/leave a port under its own power without a tug. The thruster is powered by a thrust motor connected thereto.

Figure 1:
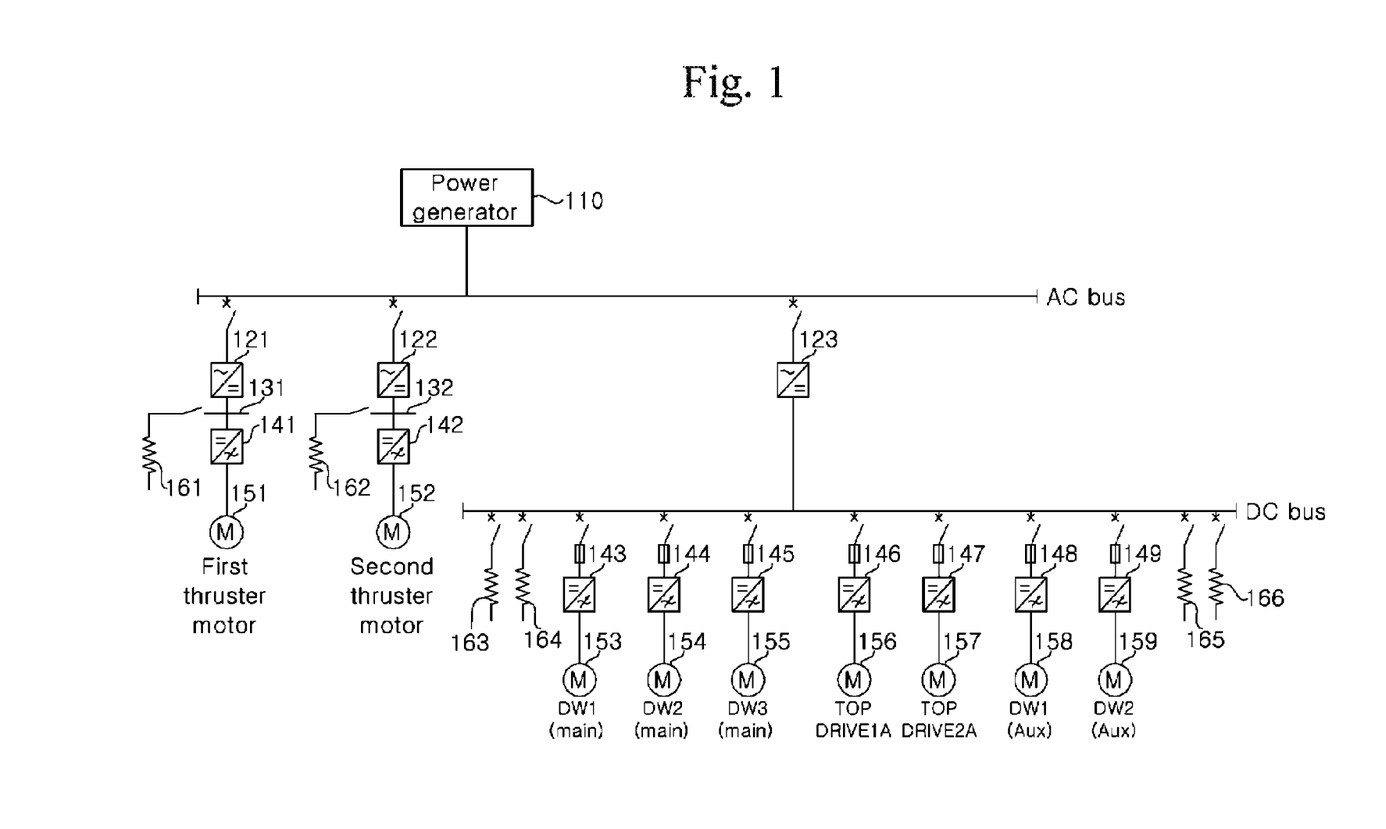
FIG. 1 is a view of a typical power supply system known in the art.

FIG. 1 is a diagram of a typical power supply system known in the art.

Referring to FIG. 1, AC power generated by a power generator 110 is supplied to an AC bus, to which a first AC/DC converter 121, a second AC/DC converter 122, and a third AC/DC converter 123 are connected.

The first AC/DC converter 121 converts alternating current supplied from the AC bus into direct current and supplies the direct current to a first DC bus 131, and a DC/AC converter 141 converts direct current supplied from the first DC bus 131 into alternating current and supplies the alternating current to a first thruster motor 151.

The second AC/DC converter 122 converts alternating current supplied from the AC bus into direct current and supplies the direct current to a second DC bus 132, and a DC/AC converter 142 converts direct current supplied from the second DC bus 132 into alternating current and supplies the alternating current to a second thruster motor 152.

The third AC/DC converter 123 converts alternating current supplied from the AC bus into direct current and supplies the direct current to a third DC bus 133, and a plurality of DC/AC converters 143 to 148 are connected to the third DC bus 133. The plurality of DC/AC converters 143 to 148 convert direct current supplied from the third DC bus 133 into alternating current and supply the alternating current to corresponding ones of a plurality of draw-works motors 153, 154, 155, 158, 159 and a plurality of top drive motors 156, 157.

Since the draw-works motors 153, 154, 155, 158, 159 and the top drive motors 156, 157 are configured to repeatedly lift or lower drilling equipment such as a drill pipe, a brake is frequently put on the motors to bring the motors to a sudden stop or to rotate the motors in a reverse direction during rotation at rated load, and, for the thruster motors 151, 152, a brake is also frequently put on the motors to bring the motors to a sudden stop or to rotate the motors in the reverse direction during rotation at rated load. When a brake is put on the motors, regenerative power is generated in the motors. In addition, when a thruster is rotated due to a disturbance, regenerative power is also generated in the thruster motors.

When regenerative power is generated in the draw-works motors, the top drive motors, or the thruster motors, voltage of a DC bus connected to the draw-works motors, the top drive motors, or the thruster motors is increased, and, when the voltage is increased beyond a degree which the DC bus can accommodate, the DC bus is tripped.

Thus, the typical power supply system is provided with resistors 161 to 166 to consume regenerative power as heat, thereby preventing the DC bus from tripping.

Figure 2:
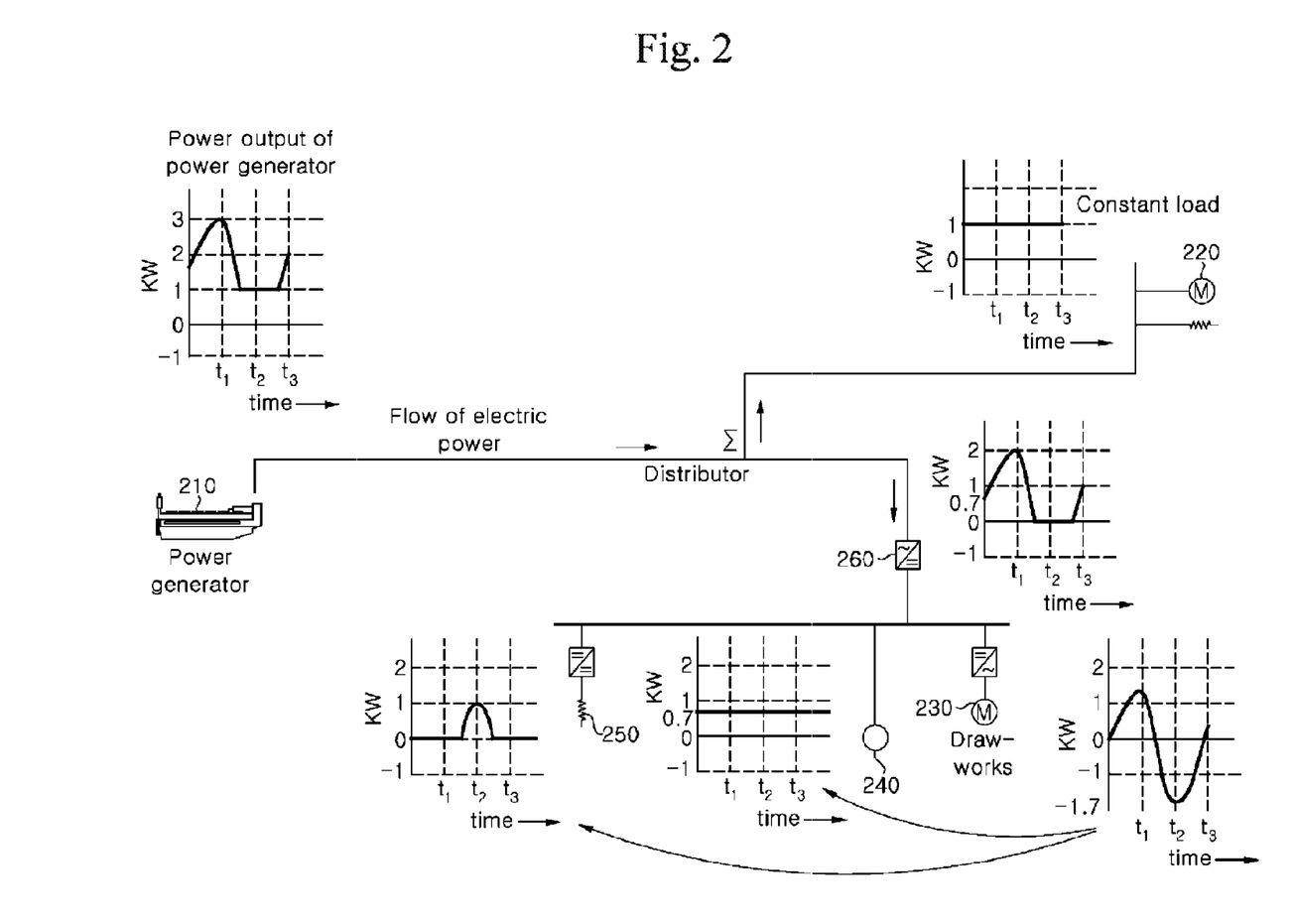
FIG. 2 is a graph showing power consumption of each component of a typical power supply system known in the art.

FIG. 2 is a graph showing power consumption of each component of a typical power supply system known in the art.

Referring to FIG. 2, electric power produced by a power generator is supplied to a first load 220 and an AC/DC converter 260 through a distributor. The AC/DC converter 260 converts alternating current into direct current and supplies the direct current to a second load 240 while supplying the direct current to a draw-works 230 through a DC/AC converter. Each of the first load 220 and the second load 240 is a load that consumes a constant level of electric power. On the contrary, power consumption of the draw-works 230 changes continuously, and, in FIG. 2, a negative value of electric power means that regenerative power is generated. Regenerative power generated in the draw-works 230 is consumed by the second load or a resistor 250.

In FIG. 2, it can be seen that abrupt change in power consumption of the draw-works 230 causes abrupt change in power output of the power generator 210. A diesel power generator consumes more fuel and discharges more exhaust gas in the case where power output is maintained at a constant level than in the case where power output is abruptly changed.

In order to supply suitable electric power corresponding to abrupt change in power consumption of the draw-works motors, the top drive motors, and the thruster motors, it is necessary to rapidly change power output of the power generator. However, the power generator has difficulty providing suitable electric power corresponding to abrupt change in power consumption of the draw-works motors, the top drive motors, and the thruster motors due to low responsiveness thereof. If suitable power supply to the draw-works motors, the top drive motors, and the thruster motors is not achieved, a dangerous situation can occur due to characteristics of drilling operation. Further, when power supply to the draw-works motors or the top drive motors is suddenly interrupted upon loss of power, a dangerous situation can also occur.

In other words, typical power supply systems have problems such as energy waste due to consumption of regenerative power by resistors, increase in fuel consumption and exhaust gas due to abrupt change in power output of a power generator, difficulty in suitable electric power supply to draw-works motors, top drive motors, and thruster motors, and danger upon loss of power.

DISCLOSURE

Technical Problem

It is an aspect of the present invention to provide a hybrid power supply apparatus and method for an offshore plant which can efficiently utilize regenerative power, maintain power output of a generator at a constant level, supply suitable electric power corresponding to abrupt change in power consumption of electric loads, and supply electric power upon sudden loss of power.

Technical Solution

In accordance with one aspect of the present invention, there is provided a hybrid power supply apparatus for an offshore plant, including: a power generator; an AC/DC converter converting alternating current produced by the power generator into direct current and supplying the direct current to a DC bus; an electric power load connected to the DC bus and generating regenerative power; a first power storage unit storing electric power when a voltage of the DC bus is maintained at a first threshold value or higher for a first period of time and supplying electric power to the DC bus when the voltage of the DC bus is maintained at a second threshold value or less for a second period of time; and a first resistor consuming electric power when the voltage of the DC bus is maintained at the first threshold value or higher for a third period of time, wherein the third period of time is longer than the first period of time.

The hybrid power supply apparatus may further include a first DC/DC converter connected to the DC bus, wherein the first power storage unit and the first resistor may be connected to the first DC/DC converter.

The hybrid power supply apparatus may further include: a first DC/DC converter connected to the DC bus; and a second DC/DC converter connected to the DC bus, wherein the first power storage unit is connected to the first DC/DC converter, and the first resistor is connected to the second DC/DC converter.

The first power storage unit may be an ultracapacitor.

The electric power load may be a draw-works.

The electric power load may be a top drive.

In accordance with another aspect of the present invention, there is provided a hybrid power supply method for an offshore plant, including: measuring a voltage of a DC bus; storing, by a power storage unit, electric power when a voltage of the DC bus is maintained at a first threshold value or higher for a first period of time; supplying, by the power storage unit, electric power to the DC bus when the voltage of the DC bus is maintained at a second threshold value or less for a second period of time, wherein the DC bus is connected to an electric power load generating regenerative power.

The hybrid power supply method may further include consuming, by a resistor, electric power when the voltage of the DC bus is maintained at the first threshold value or higher for a third period of time, wherein the third period of time may be longer than the first period of time.

The DC bus may be connected to a first DC/DC converter, and the power storage unit and the resistor may be connected to the first DC/DC converter.

The DC bus may be connected to a first DC/DC converter and a second DC/DC converter; the power storage unit may be connected to the first DC/DC converter; and the resistor may be connected to the second DC/DC converter.

The power storage unit may be an ultracapacitor.

The electric power load may be a draw-works.

The electric power load may be a top drive.

Advantageous Effects

According to embodiments of the present invention, it is possible to provide a hybrid power supply apparatus and method which allow regenerative power generated in a draw-works motor, a top drive motor, and a thruster motor to be stored in a power storage unit and supply electric power stored in the power storage unit upon abrupt increase in power consumption of the draw-works motor, the top drive motor, and the thruster motor to efficiently utilize regenerative power while maintaining power output of a power generator at a constant level to reduce exhaust gas.

In addition, it is possible to provide a hybrid power supply apparatus and method which use an ultracapacitor having high responsiveness as a power storage unit, thereby supplying electric power appropriately for abruptly changing power consumption of electric loads.

Further, it is possible to provide a hybrid power supply apparatus and method which can utilize electric power stored in a power storage unit to safely shut down drilling equipment such as a draw-works or a top drive upon transients or loss of power.

EMBODIMENTS

Hereinafter, embodiments of the present invention will be described with reference to the accompanying drawings. It should be noted that like components will be denoted by like reference numerals throughout the specification and the accompanying drawings. In addition, descriptions of details apparent to those skilled in the art will be omitted for clarity.

Figure 3:
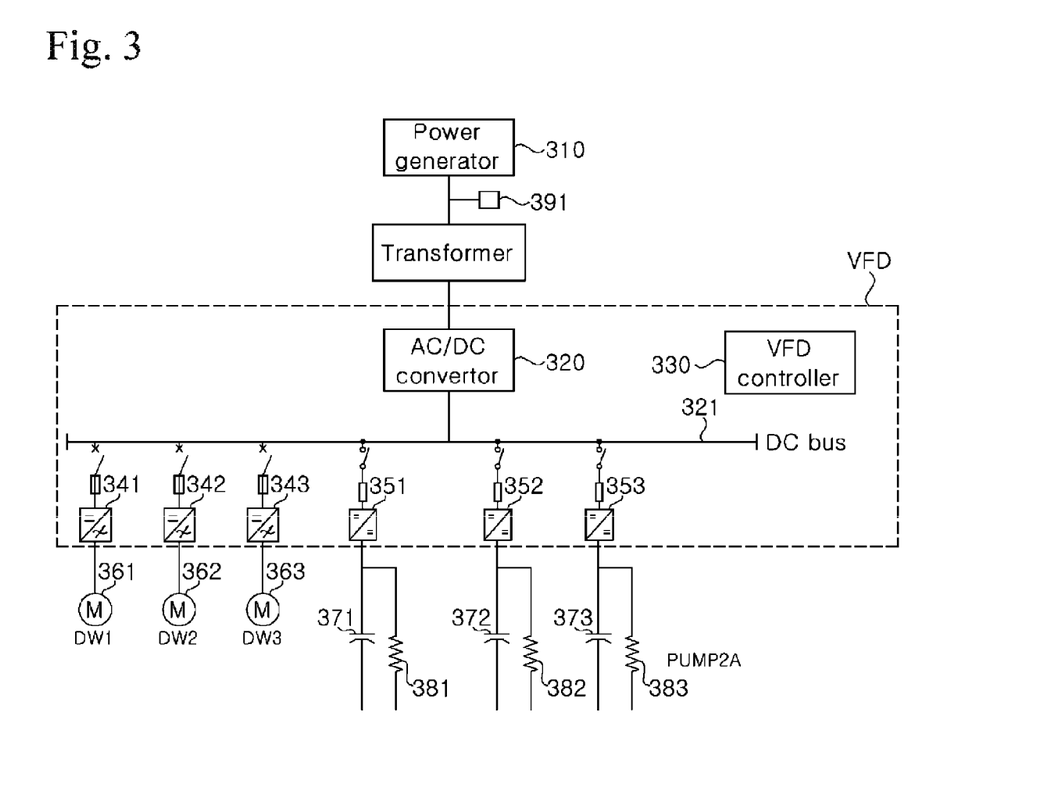
FIG. 3 is a view of a hybrid power supply apparatus for an offshore plant according to the first embodiment of the present invention.

First, a hybrid power supply apparatus for an offshore plant according to embodiments of the present invention will be described with reference to FIGS. 3 to 5. FIG. 3 is a view of a hybrid power supply apparatus for an offshore plant according to the first embodiment of the present invention, FIG. 4 is a view of a hybrid power supply apparatus for an offshore plant according to the second embodiment of the present invention, and FIG. 5 is a view of a hybrid power supply apparatus for an offshore plant according to the third embodiment of the present invention.

Figure 4:
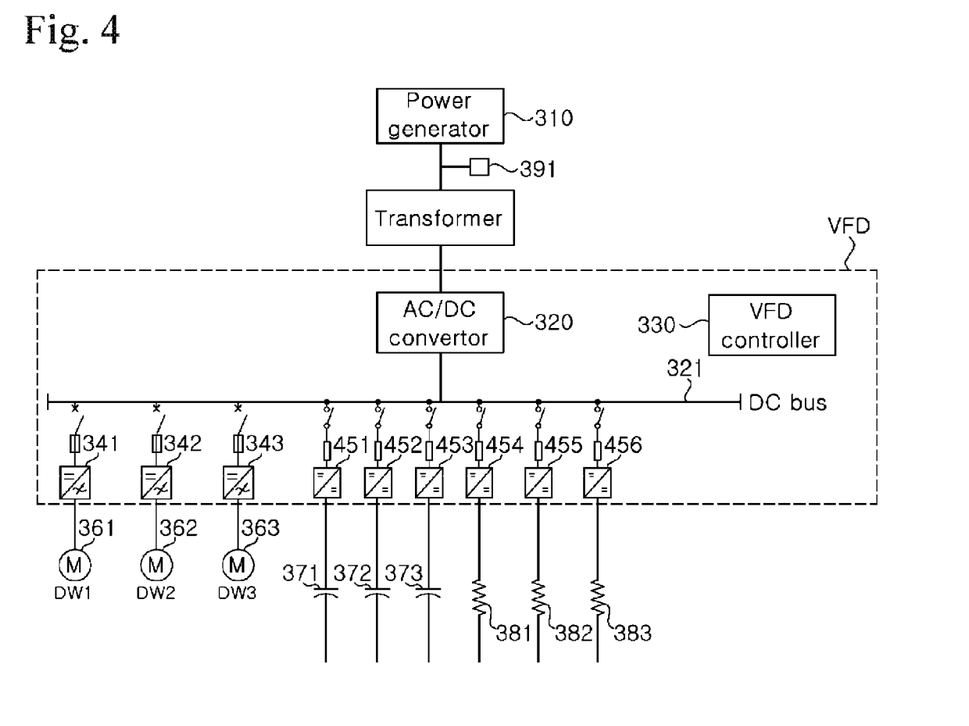
FIG. 4 is a view of a hybrid power supply apparatus for an offshore plant according to the second embodiment of the present invention.
Figure 5:
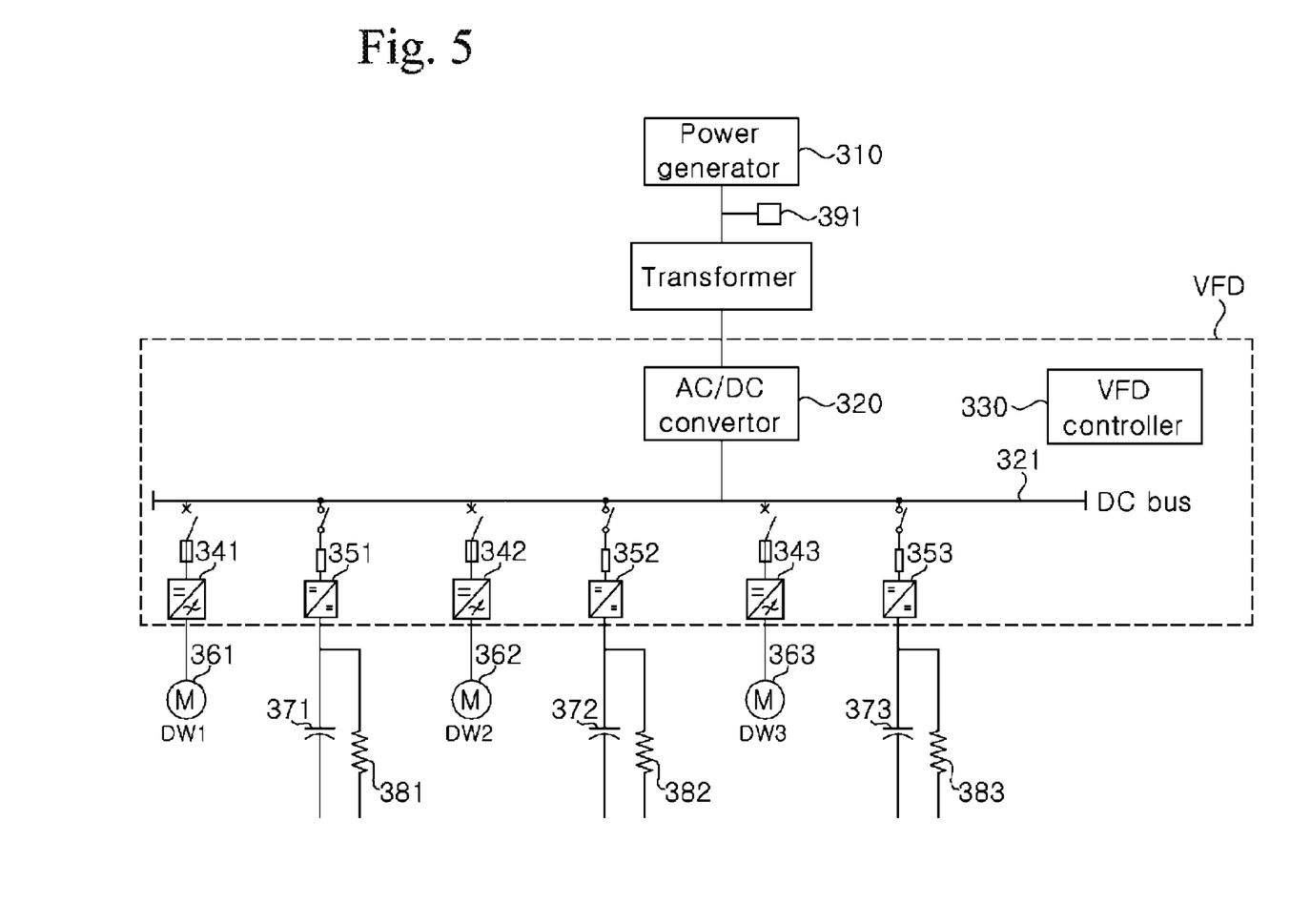
FIG. 5 is a view of a hybrid power supply apparatus for an offshore plant according to the third embodiment of the present invention.

Referring to FIGS. 3 to 5, a hybrid power supply apparatus for an offshore plant according to the first embodiment of the present invention includes a power generator 310, an AC/DC converter 320, a DC bus 321, a variable frequency drive (VFD) controller 330, DC/DC converters 351 to 353, electric power loads 361 to 363, power storage units 371 to 373, resistors 381 to 383, and a sensor 391.

The power generator 310 is a device producing electric power for an offshore plant and is connected to the AC/DC converter 320 via an AC bus. Alternatively, electric power produced by the power generator 310 may be supplied to the AC/DC converter 320 after being altered to a voltage suitable for use in electric power loads. The power generator 310 is an AC Generator and can produce AC power.

The AC/DC converter 320 converts AC power produced by the power generator 310 into direct current and supplies the direct current to the DC bus 321.

The DC bus 321 supplies electric power to electric power loads connected to the DC bus 321. Electric power loads using DC power may be connected directly to the DC bus 321, and electric power loads using AC power may be connected to the DC bus 321 via DC/AC converters (341 to 343).

The electric power loads 361 to 363 of FIG. 3 are electric power loads using AC power and are connected to the DC bus 321 via the DC/AC converters 341 to 343, respectively. The DC/AC converters 341 to 343 convert direct current supplied from the DC bus 321 into alternating current and supply the alternating current to the electric power loads 361 to 363, respectively.

The electric power loads 361 to 363 may be draw-works motors or top drive motors.

Although, in FIG. 3, three draw-works motors 361 to 363, as the electric power loads, are shown as being connected to the DC bus 321, it should be understood that the present invention is not limited thereto and a varying number of draw-works motors and top drive motors may be connected to the DC bus 321.

Since the draw-works motors 361 to 363 have to repeatedly lift or lower drilling equipment such as a drill pipe, a brake is frequently put on the motors to bring the motor to a sudden stop or to rotate the motors in the reverse direction in the middle of rotation at rated load, causing generation of regenerative power in the draw-works motors.

The power storage units 371 to 373 receive electric power from the DC bus 321 so as to store the electric power when a voltage of the DC bus 321 is maintained at a first threshold value or higher for a first period of time, and the power storage units supply electric power to the DC bus 321 when the voltage of the DC bus 321 is maintained at a second threshold value or less for a second period of time. For example, assuming that the DC bus 321 is a 720 V DC bus and is tripped at 750 V or higher, the first threshold value may be set to 740 V.

The DC/DC converters 351 to 353 measure the voltage of the DC bus 321, and supply electric power from the DC bus 321 to the power storage units 371 to 373 such that the power storage units 371 to 373 store electric power when the voltage of the DC bus is maintained at the first threshold value or higher for the first period of time, whereas the DC/DC converters allow electric power to flow from the power storage units 371 to 373 to the DC bus 321 such that the DC bus 321 can receive electric power from the power storage units 371 to 373 when the voltage of the DC bus is maintained at the second threshold value or less for the second period of time.

When regenerative power is generated in the electric power loads 361 to 363, the voltage of the DC bus 321 is increased, and, when power consumption of the electric power loads 361 to 363 is abruptly increased, the voltage of the DC bus 321 drops.

In other words, when regenerative power is generated in the electric power loads 361 to 363 causing increase in the voltage of the DC bus 321 and the voltage of the DC bus 321 is maintained at the threshold value or higher for the first period of time, the DC/DC converters 351 to 353 supply electric power to the power storage units 371 to 373 such that the power storage units 371 to 373 store electric power, thereby allowing regenerative power generated in the electric power loads 361 to 363 to be stored in the power storage units 371 to 373.

When power consumption of the electric power loads 361 to 363 is abruptly increased causing drop in the voltage of the DC bus 321 and the voltage of the DC bus 321 is maintained at the second threshold value or less for the second period of time, the DC/DC converters 351 to 353 allow electric power to flow from the power storage units 371 to 373 to the DC bus 321 such that the DC bus 321 receives electric power from the power storage units 371 to 373. The power storage units 371 to 373 may be at least of an ultracapacitor, a capacitor, a battery, and a flywheel. Particularly, when the power storage units 371 to 373 are ultracapacitors, it is possible to rapidly supply electric power to the electric power loads 361 to 363 upon a sudden increase in power consumption of the electric power loads 361 to 363 since such an ultracapacitor has higher responsiveness than the power generator 310.

In addition, the power storage units 371 to 373 can supply electric power to the DC bus 321 upon transients or loss of power. When a sensor for detecting transients or loss of power 391 senses a transient or loss of power and sends detection signals to the DC/DC converters 351 to 353, the DC/DC converters 351 to 353 allow electric power to be supplied from the power storage units 371 to 373 to the DC bus 321.

The sensor 391 may be mounted on at least one of a switchboard and the DC bus 321.

Drilling equipment such as a draw-works and a top drive can cause a dangerous situation upon abrupt interruption of power supply. Thus, the power storage units 371 to 373 supply electric power to the DC bus 321 upon transients or loss of power to safely shut down the drilling equipment.

The resistors 381 to 383 consume electric power when the voltage of the DC bus 321 is maintained at the first threshold value or higher for a third period of time. Here, the third period of time is longer than the first period of time.

When regenerative power is generated in the electric power loads 361 to 363 causing increase in the voltage of the DC bus 321 and the voltage of the DC bus is maintained at the threshold value or higher for the first period of time, the power storage units 371 to 373 store electric power. When the power storage units 371 to 373 are full, the voltage of the DC bus 321 does not drop and is continuously maintained at the first threshold value or higher. Thus, if the voltage of the DC bus 321 is maintained at the first threshold value or higher for the third period of time, it can be determined that the power storage units 371 to 373 are full. When regenerative power is continuously generated even after the power storage units 371 to 373 are full, the voltage of the DC bus 321 continuously increases, thereby causing the DC bus 321 to be tripped. Thus, when the voltage of the DC bus 321 is maintained at the first threshold value or higher for the third period of time, the DC/DC converters 351 to 353 allow the resistors 381 to 383 to consume electric power.

Although FIGS. 3 to 5 show three power storage units 371 to 373 and three resistors 381 to 383, it should be understood that the present invention is not limited thereto and may include varying numbers of power storage units and resistors.

As shown in FIG. 3, the power storage units 371 to 373 and the corresponding resistors 381 to 383 may be connected to the DC bus 321 in pairs. In other words, a first power storage unit 371 and a first resistor 381 are connected to the DC bus 321 via a first DC/DC converter 351; a second power storage unit 372 and a second resistor 382 are connected to the DC bus 321 via a second DC/DC converter 352; and a third power storage unit 373 and a third resistor 383 are connected to the DC bus 321 via a third DC/DC converter 353. When the power storage unit and the resistor are connected to the same DC/DC converter, as in FIG. 3, it is possible to reduce the number of required DC/DC converters and the overall size of the apparatus.

Alternatively, the plural power storage units 371 to 373 and the plural resistors 381 to 383 may be connected to the DC bus 321 via separate DC/DC converters 451 to 456, respectively, as shown in FIG. 4. In other words, a first power storage unit 371 is connected to the DC bus 321 via a first DC/DC converter 451; a second power storage unit 372 is connected to the DC bus 321 via a second DC/DC converter 452; a third power storage unit 373 is connected to the DC bus 321 via a third DC/DC converter 453; a first resistor 381 is connected to the DC bus 321 via a fourth DC/DC converter 454; a second resistor 382 is connected to the DC bus 321 via a fifth DC/DC converter 455; and a third resistor 383 is connected to the DC bus 321 via a sixth DC/DC converter 456. When the plural power storage units 371 to 373 and the plural resistors 381 to 383 are connected to separate DC/DC converters 451 to 456, respectively, as in FIG. 4, it is possible to operate the plural power storage units 371 to 373 and the plural resistors 381 to 383 in an individual manner.

Alternatively, a single power storage unit 371 to 373 and a single resistor 381 to 383 may be dedicated to a single electric power load 361 to 363, as shown in FIG. 5. In other words, when regenerative power is generated in a first electric power load 361, a first power storage unit 371 stores the regenerative power and a first resistor 381 does not consume electric power until the first power storage unit 371 is full. When regenerative power is generated in a second electric power load 362, a second power storage unit 372 stores the regenerative power and a second resistor 382 does not consume electric power until the second power storage unit 372 is full. When regenerative power is generated in a third electric power load 363, a third power storage unit 373 stores the regenerative power and a third resistor 383 does not consume electric power until the third power storage unit 372 is full.

When regenerative power is generated in the first electric power load 361, a first DC/AC converter 341 detects generation of regenerative power in the first electric power load 361 and sends a control signal to the first DC/DC converter 351. In response to the control signal, the first DC/DC converter 351 allows electric power to be supplied from the DC bus 321 to the first power storage unit 371 such that the first power storage unit 371 can store electric power. Then, the first DC/DC converter 351 detects whether the first power storage unit 371 is full, and, when the first power storage unit 371 is full, the first DC/DC converter allows the first resistor 381 to consume electric power. Although the first power storage unit 371 and the first resistor 381 are shown as being connected to the same DC/DC converter 351, it should be understood that the first power storage unit 371 and the first resistor 381 may be connected to different DC/DC converters.

Figure 6:
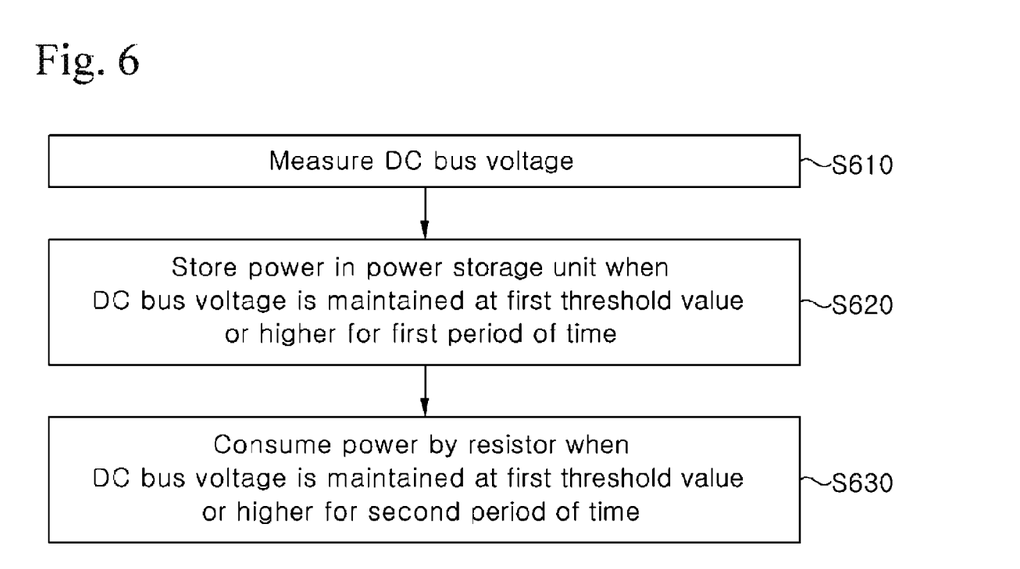
FIG. 6 is a flowchart of a process of supplying electric power to a power storage unit in a hybrid power supply method for an offshore plant according to an embodiment of the present invention.

Next, a hybrid power supply method for an offshore plant according to an embodiment of the present invention will be described with reference to FIGS. 6 to 8. FIG. 6 is a flowchart of a process of supplying electric power to a power storage unit in a hybrid power supply method for an offshore plant according to an embodiment of the present invention, FIG. 7 is a flowchart of a process of supplying electric power from the power storage unit to a DC bus upon power shortage in the hybrid power supply method for an offshore plant according to the embodiment of the present invention, and FIG. 8 is a flowchart of a process of supplying electric power from the power storage unit to the DC bus upon loss of power in the hybrid power supply method for an offshore plant according to the embodiment of the invention.

Referring to FIG. 6, the voltage of a DC bus is measured (S610); electric power is stored in a power storage unit when the voltage of the DC bus 321 is maintained at a first threshold value or higher for a first period of time (S620); and electric power is consumed by a resistor when the voltage of the DC bus 321 is maintained at the first threshold value or higher for a second period of time (S630).

Figure 7:
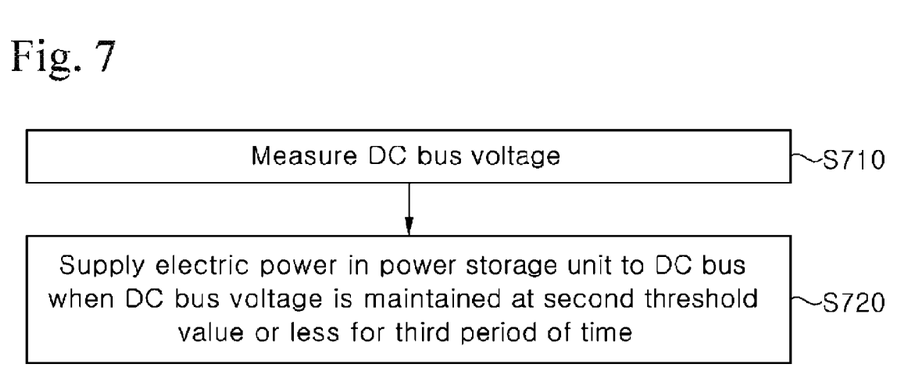
FIG. 7 is a flowchart of a process of supplying electric power from the power storage unit to a DC bus upon power shortage in the hybrid power supply method for an offshore plant according to the embodiment of the present invention.
Figure 8:
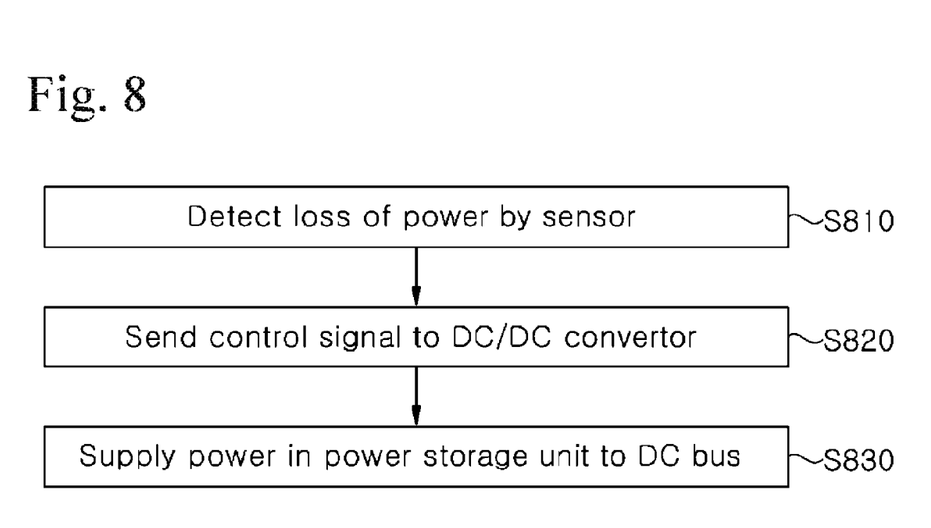
FIG. 8 is a flowchart of a process of supplying electric power from the power storage unit to the DC bus upon loss of power in the hybrid power supply method for an offshore plant according to the embodiment of the present invention.

Referring to FIG. 7, the voltage of the DC bus is measured (S710); and electric power stored in the power storage unit is supplied to the DC bus when the voltage of the DC bus is maintained at a second threshold value or less for a third period of time (S720).

When a sensor 391 detects loss of power (S810), the sensor 391 sends a control signal to a DC/DC converter (S820), and the DC/DC converter allows the power storage unit to supply electric power to the DC bus in response to the control signal from the sensor 391 (S830).

Figure 9:
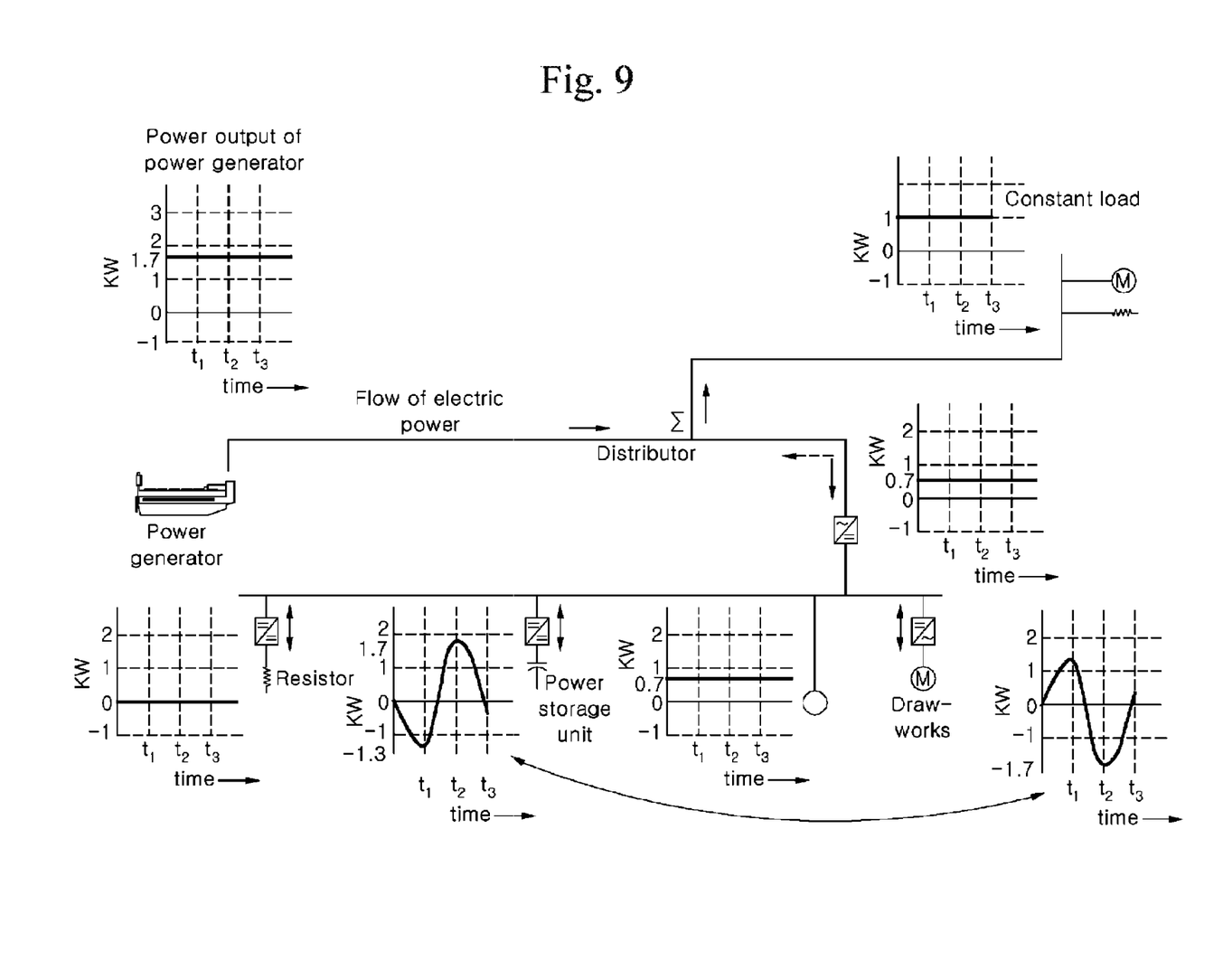
FIG. 9 is a graph showing power consumption of each component of the power supply apparatus according to the embodiments of the present invention.

Next, power consumption of each component of the power supply apparatus according to the embodiments of the invention will be described with reference to FIG. 9. FIG. 9 is a graph showing power consumption of each component of the power supply apparatus according to the embodiments of the invention.

As shown in FIG. 9, it can be seen that, when regenerative power is generated in the electric power load, the power storage unit stores the generated regenerative power, and, when power consumption of the electric power load is suddenly increased, the power storage unit supplies electric power to the electric power load, thereby maintaining power output of the power generator at a constant level.

Although some embodiments have been described herein, it should be understood by those skilled in the art that these embodiments are given by way of illustration only, and that various modifications, variations and alterations can be made without departing from the spirit and scope of the invention. Therefore, the embodiments disclosed herein should not be construed as limiting the technical scope of the present invention, but should be construed as illustrating the idea of the present invention. The scope of the present invention should be interpreted according to the appended claims as covering all modifications or variations derived from the appended claims and equivalents thereof.

The invention claimed is:

1. A hybrid power supply apparatus for an offshore plant, comprising:
    a power generator;
    an AC/DC converter converting alternating current produced by the power generator into direct current and supplying the direct current to a DC bus;
    an electric power load connected to the DC bus and generating regenerative power;
    a first power storage unit storing electric power when a voltage of the DC bus is maintained at a first threshold value or higher for a first period of time and supplying electric power to the DC bus when the voltage of the DC bus is maintained at a second threshold value or less for a second period of time; and
    a first resistor consuming electric power when the voltage of the DC bus is maintained at the first threshold value or higher for a third period of time,
    wherein the third period of time is longer than the first period of time.

2. The hybrid power supply apparatus according to claim 1, further comprising:
    a first DC/DC converter connected to the DC bus,
    wherein the first power storage unit and the first resistor are connected to the first DC/DC converter.

3. The hybrid power supply apparatus according to claim 1, further comprising:
    a first DC/DC converter connected to the DC bus; and
    a second DC/DC converter connected to the DC bus,
    wherein the first power storage unit is connected to the first DC/DC converter, and the first resistor is connected to the second DC/DC converter.

4. The hybrid power supply apparatus according to claim 1, wherein the first power storage unit is an ultracapacitor.

5. The hybrid power supply apparatus according to claim 1, wherein the electric power load is a draw-works.

6. The hybrid power supply apparatus according to claim 1, wherein the electric power load is a top drive.

7. A hybrid power supply method for an offshore plant, comprising:
    measuring voltage of a DC bus;
    storing, by a power storage unit, electric power when a voltage of the DC bus is maintained at a first threshold value or higher for a first period of time;
    supplying, by the power storage unit, electric power to the DC bus when the voltage of the DC bus is maintained at a second threshold value or less for a second period of time,
    wherein the DC bus is connected to an electric power load generating regenerative power.

8. The hybrid power supply method according to claim 7, further comprising:
    consuming, by a resistor, electric power when the voltage of the DC bus is maintained at the first threshold value or higher for a third period of time,
    wherein the third period of time is longer than the first period of time.

9. The hybrid power supply method according to claim 8, wherein the DC bus is connected to a first DC/DC converter, and the power storage unit and the resistor are connected to the first DC/DC converter.

10. The hybrid power supply method according to claim 8, wherein the DC bus is connected to a first DC/DC converter and a second DC/DC converter, and the power storage unit is connected to the first DC/DC converter and the resistor is connected to the second DC/DC converter.

11. The hybrid power supply method according to claim 7, wherein the power storage unit is an ultracapacitor.

12. The hybrid power supply method according to claim 7, wherein the electric power load is a draw-works.

13. The hybrid power supply method according to claim 7, wherein the electric power load is a top drive.

* * * * *